(12) United States Patent
Mayblum

(10) Patent No.: US 9,414,207 B2
(45) Date of Patent: Aug. 9, 2016

(54) ENHANCED MULTI-MEDIA MESSAGING SERVICES THAT PERMIT OVERSIZED MESSAGES

(71) Applicant: CELLCO PARTNERSHIP, Arlington, VA (US)

(72) Inventor: Amir Mayblum, Walnut Creek, CA (US)

(73) Assignee: Cellco Partnership, Basking Ridge, NJ (US)

( * ) Notice: Subject to any disclaimer, the term of this patent is extended or adjusted under 35 U.S.C. 154(b) by 35 days.

(21) Appl. No.: 14/472,299

(22) Filed: Aug. 28, 2014

(65) Prior Publication Data

US 2014/0370924 A1  Dec. 18, 2014

Related U.S. Application Data

(62) Division of application No. 13/434,404, filed on Mar. 29, 2012, now Pat. No. 8,849,324.

(51) Int. Cl.
*H04W 4/12* (2009.01)
*H04W 4/14* (2009.01)

(52) U.S. Cl.
CPC . *H04W 4/12* (2013.01); *H04W 4/14* (2013.01)

(58) Field of Classification Search
CPC .................................. H04W 4/12; H04W 4/14
See application file for complete search history.

(56) References Cited

U.S. PATENT DOCUMENTS

2005/0054287 A1  3/2005  Kim
2006/0176878 A1*  8/2006  Han ........................ H04W 4/18
                                                           370/389

OTHER PUBLICATIONS

"3rd Generation Partnership Project; Technical Specification Group Core Network and Terminals; Technical Realization of the Short Message Service (SMS) (Release 9), 3GPP TS 23.040 V9.0.0," pp. 1-202, Jun. 2009.
United States Office Action issued in U.S. Appl. No. 13/434,404 dated Feb. 12, 2014.
United States Notice of Allowance issued in U.S. Appl. No. 13/434,404 dated Jun. 9, 2014.
3GPP (3rd Generation Partnership Project (3GPP (TM). 2009. 3rd Generation Partnership Project; Technical specification Group Core Network and Terminals; Technical realization of the Short Message Service (SMS) (Release 9). Technical Specification 3GPP TS 23.040 V9.0.0 (Jun. 2009). Global System for Mobile Communications (GSM) 3GPP, Valbonne, France, Jun. 2009. 202 pages.

\* cited by examiner

*Primary Examiner* — Chuong A Ngo

(57) ABSTRACT

A multimedia messaging service (MMS) subsystem may include a user interface configured to allow a user to formulate an MMS message for delivery to a designated phone number; an oversized MMS message detection subsystem configured to detect when the formulated MMS message exceeds an allowable size limit; and an oversized MMS message management subsystem configured to divide an oversized MMS message into smaller MMS messages that are each within the allowable size limit and to cause each smaller MMS message to be delivered to the designated phone number/address. The MMS subsystem may be part of a wireless mobile communication device. Portions of the MMS subsystem may in addition or instead be part of a multimedia messaging service center (MMSC) server.

20 Claims, 7 Drawing Sheets

US 9,414,207 B2

ENHANCED MULTI-MEDIA MESSAGING SERVICES THAT PERMIT OVERSIZED MESSAGES

CROSS REFERENCE TO RELATED APPLICATION

This application is a Division of U.S. application Ser. No. 13/434,404 filed on Mar. 29, 2012, which is incorporated by reference herein in its entirety.

BACKGROUND

This disclosure relates to multimedia messaging service (MMS) messages and the systems that manage them.

MMS messages allow for the inclusion of attachments and graphics, substantially enhancing the utility of short message service (SMS) messages. However, this added functionality allows MMS messages to be formulated that exceed the size limit mandated by the service provider and enforced by the wireless mobile communication devices on which the messages are formulated and/or other systems in the network.

When such an oversized MMS message is detected, an error message is usually generated and the message is not delivered. The sender must either reformulate the message, requiring more time, or abandon the message, wasting the time that has already been spent and frustrating the message-communication purpose of the MMS messaging system. In cases in which the message merely indicates delivery failure, the user is further forced to divine that the cause of the failure is due to message length rather than a network/delivery failure.

A solution is needed that minimizes this wasted time and/or that does not frustrate the message-communication purpose of the MMS messaging system.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
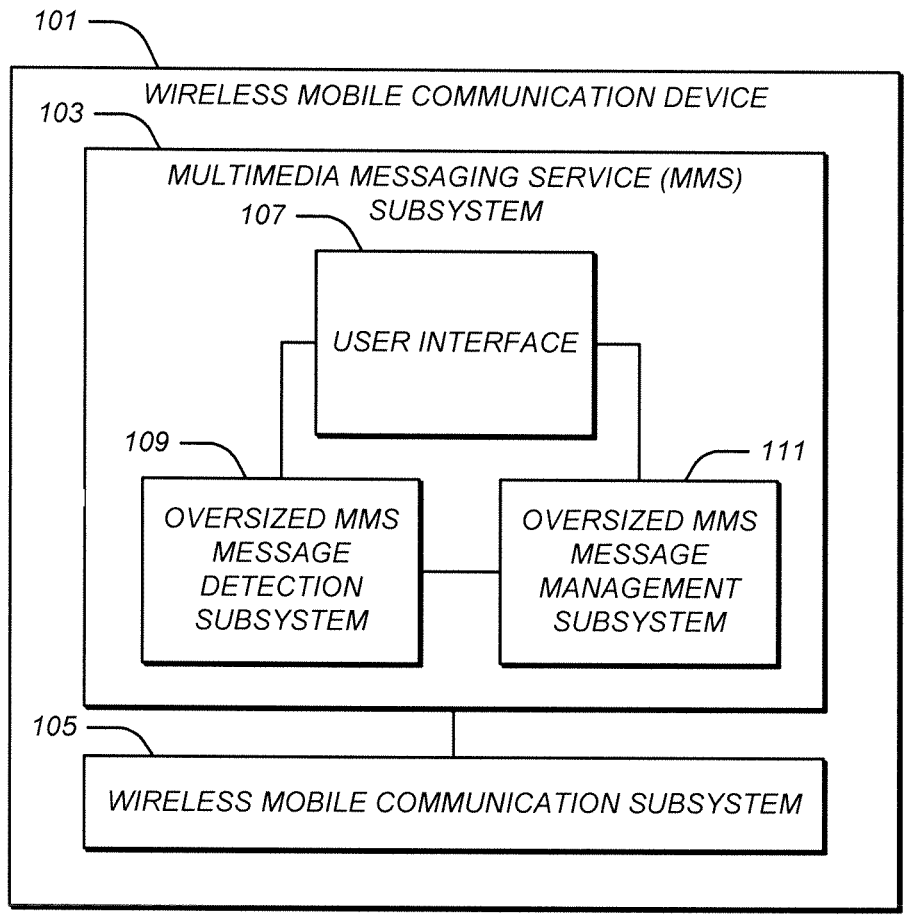
FIG. 1 illustrates an example of a wireless mobile communication device containing a multimedia messaging service (MMS) subsystem that manages oversized MMS messages.

FIG. 1 illustrates an example of a wireless mobile communication device 101 containing a multimedia messaging service (MMS) subsystem 103 that detects an oversized MMS message and automatically reacts, or interacts with the user of the wireless mobile communication device 101, to rectify the problem without rejecting the MMS message and sending an error message to the user as above. The wireless mobile communication device 101 may be of any type. For example, the wireless mobile communication device 101 may be a smartphone, a laptop computer, a tablet computer, a netbook, or a PDA.

As illustrated in FIG. 1, the wireless mobile communication device 101 includes a wireless mobile communication subsystem 105. The wireless mobile communication subsystem 105 is configured to wirelessly send and receive MMS messages to and from other electronic devices. The wireless mobile communication subsystem 105 may include one or more wireless transceivers and associated signaling and data processing circuitry and software configured to provide this functionality.

Each MMS message includes one or more headers. Each MMS message may also include text, graphics, and/or attachments (such as documents, images or videos).

The MMS subsystem 103 includes a user interface 107, an oversized MMS message detection subsystem 109, and an oversized MMS message management subsystem 111. The user interface 107 is configured to allow a user to formulate an MMS message for delivery to a designated phone number. The user interface 107 also includes a user-actuated control that allows the user to direct that a completed MMS message be sent.

The user interface 107 may be of any type. For example, the user interface may include a display, which may be a touch screen, keyboard, pointing device, microphone, camera, and/or audio transducer among others.

The MMS subsystem 103 is configured to allow a user to formulate an MMS message using the user interface 107. For example, the MMS subsystem 103 in conjunction with the user interface 107 may be configured to allow the user to enter a phone number or address of the intended recipient, to enter text, to embed one or more graphics, and/or to attach one or more attachments.

The allowable size of the MMS message may be limited. This limitation may be imposed and enforced by the wireless mobile communication device 101, by a multimedia messaging service center (MMSC) server that manages MMS messages, and/or by any other device or entity in the network. The allowable size of the MMS message may be any amount, such as 1.2 MB, and established by network or carrier policy, perhaps being limited by the technology used by the carrier. The allowable size may be the size of the entire MMS message, including all of its headers and, when present, its text, graphics, and attachments.

The oversized MMS message detection subsystem 109 is configured to detect when a formulated MMS message exceeds an allowable size limit. The oversized MMS messaging detection subsystem 109 may be configured to detect whether a formulated MMS message exceeds the allowable size limit by comparing the size of the MMS message—including all of its components—to a predetermined allowable size limit. The oversized MMS messaging detection subsystem 109 may be configured to detect whether a formulated MMS message exceeds the allowable size limit after a user has completed the MMS message and directed that it be sent, while the user is formulating the MMS message as soon as it exceeds the allowable size limit, or at both times.

In response to the oversized MMS messaging detection subsystem 109 detecting that the MMS message has exceeded the allowable size limit, before the MMS message is sent, the oversized MMS message management subsystem 111 is activated. The oversized MMS message management subsystem 111 is configured to automatically divide an oversized MMS message into smaller MMS messages that are each within the allowable size limit and to then cause each smaller MMS message to be delivered to the phone number/address designated in the oversized MMS message using the wireless mobile communication subsystem 105.

The oversized MMS message management subsystem 111 may be configured to cause the user interface 107 to issue an "MMS oversized" alert when an oversized MMS message is detected by the oversized MMS messaging detection subsystem 109. The alert may be delivered by the wireless mobile communication device 101 to the user visually, audibly, tactilely, or by any other mechanism that indicates the issue to the user. Contemporaneously with the issuance of that oversized alert, the oversized MMS message management subsystem 111 may be configured to cause the user interface 107 to allow the user to specify whether or not the oversized MMS message management subsystem 111 should automatically divide an oversized MMS message into the smaller messages.

Figure 2:
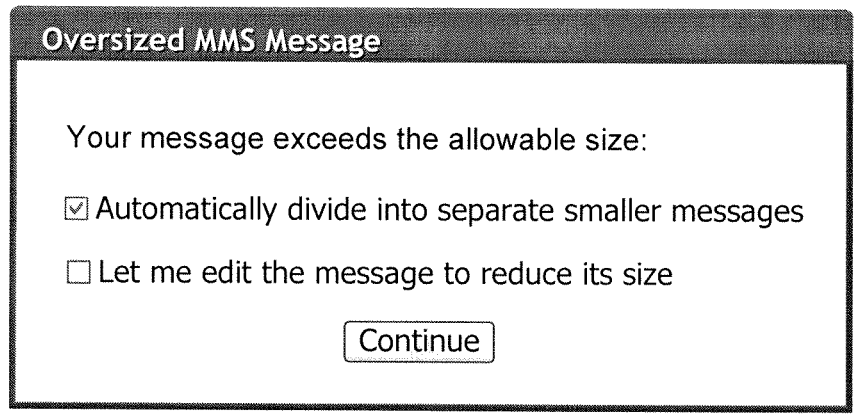
FIG. 2 illustrates an example of an oversized MMS message alert that has been caused to be issued by the multimedia messaging service (MMS) subsystem illustrated in FIG. 1.

FIG. 2 illustrates an example of an oversized MMS message alert that has been caused to be issued by the multimedia messaging service (MMS) subsystem illustrated in FIG. 1. As illustrated in FIG. 2, the oversized alert includes language alerting the user to the fact that the MMS message that the user has formulated exceeds the allowable size. The message alert also includes checkboxes that allow the user to specify whether the oversized MMS message management subsystem 111 should automatically divide the oversized MMS message into separate smaller messages or, instead, whether the user should be returned to the screen on which the user was formulating the MMS message to be given an opportunity to reduce its size to be within the allowable limit. This alert allows the user to decide whether the user is willing to bear any added delivery costs that may be associated with breaking the single oversized MMS message into smaller messages or, instead, prefers to reduce the size of the message so as to avoid such added delivery costs. The oversized MMS message management subsystem 111 may permit the smaller messages to be any combination of MMS, EMS, SMS messages. The type(s) may be selected by the user (or automatically selected by the oversized MMS message management subsystem 111).

The oversized MMS message management subsystem 111 may be configured to present the oversized alert each time an oversized MMS message is formulated. The oversized MMS message management subsystem 111 may in addition or instead be configured to allow the user to specify in a set up configuration whether oversized MMS messages should be automatically divided into the smaller MMS messages without seeking user permission each time, or whether such permission should be sought each time. Thus, the manner in which oversized MMS messages are to be automatically divided by the wireless mobile communication device 101 may be preset by the user or by network/carrier policy (which is then downloaded to the wireless mobile communication device 101 for execution). As above, this permits the oversized MMS message management subsystem 111 to automatically divide the MMS messages without the user being first subjected to such alerts. Alternatively, the oversized MMS message management subsystem 111 may be configured to present the alert after the multiple smaller messages are sent. This alert may inform the user that the MMS message was too large and had to be split into n messages (i.e., the number of messages of allowable size) and perhaps the type of messages sent.

The oversized MMS message management subsystem 111 may be configured to cause the user interface to issue the oversized alert as soon as the oversized MMS message detection subsystem 109 detects that the MMS message exceeds the allowable size limit while the message is being formulated by the user. It may in addition or instead be configured to issue the oversized alert after the oversized MMS message has been formulated and the user has directed that it be sent, stopping transmission of the oversized message by the wireless mobile communication device 101 before it is attempted.

Figure 3:
FIG. 3 illustrates an example of an oversized MMS message alert issued by the multimedia messaging service (MMS) subsystem illustrated in FIG. 1 while the MMS message is being formulated.

FIG. 3 illustrates an example of an oversized MMS message alert issued by the multimedia messaging service (MMS) subsystem illustrated in FIG. 1 while the MMS message is being formulated. The oversized alert is similar to the one illustrated in FIG. 2, except that it makes clear that the user will have an opportunity to complete his or her formulation of the oversized MMS message before it is divided into smaller messages, should the user elect this option.

The oversized MMS message management subsystem 111 may be configured to automatically divide an oversized MMS message into the smaller MMS messages in any manner. For example, the oversized MMS message management subsystem 111 may be configured to divide an oversized MMS message into smaller MMS messages in a manner that minimizes the total number of the smaller messages. This may cause the information in the smaller MMS messages that are created not to be in the same sequence as the information that appeared in the oversized MMS message. For example, a smaller number of MMS messages may be realized by placing attachments in the oversized MMS message in a sequence in the smaller MMS messages that does not match their sequence in the oversized MMS message.

The oversized MMS message management subsystem 111 may instead be configured to deliver each of the smaller MMS messages in a sequence that causes the information in the smaller MMS messages to be delivered in the same sequence as the information appeared in the oversized MMS message. In some cases, this may increase the number of the smaller messages by resulting in less efficient packaging of the information but instead maintain the order as desired by the user.

The oversized MMS message management subsystem 111 may be configured to divide an oversized MMS message into the smaller MMS messages in a manner that first minimizes the total number of the smaller MMS messages and, to the extent thereafter possible, then causes the information in the smaller MMS messages to be delivered in the same sequence as the information appeared in the oversized MMS message.

The oversized MMS message management subsystem 111 may instead be configured to divide an oversized MMS message into the smaller MMS messages in a manner that minimizes the network resources needed to deliver the smaller MMS messages. This can be done, for example, by reordering media elements in the message to best fit into a smaller number of messages. Further, it can allow media to be transcoded into smaller sizes as required to fit into a smaller number of messages.

The oversized MMS message management subsystem 111 may be configured to divide an oversized MMS message into the smaller MMS messages in other manners, including any combination of the manners described above.

In some configurations, the oversized MMS message management subsystem 111 may be configured to cause the user interface 107 to query the user as to how the user wants the oversized MMS message management subsystem to automatically divide an oversized MMS message into the smaller MMS messages, and to thereafter divide the oversized MMS messages in the manner specified by the user in response to the query. This query may be made in response to the formulation of each oversized MMS message or as a global configuration setting. In other configurations, the division algorithm may be selected by the application designer, mobile device manufacturer, or the communication provider and not subject to alteration by the user.

Figure 4:
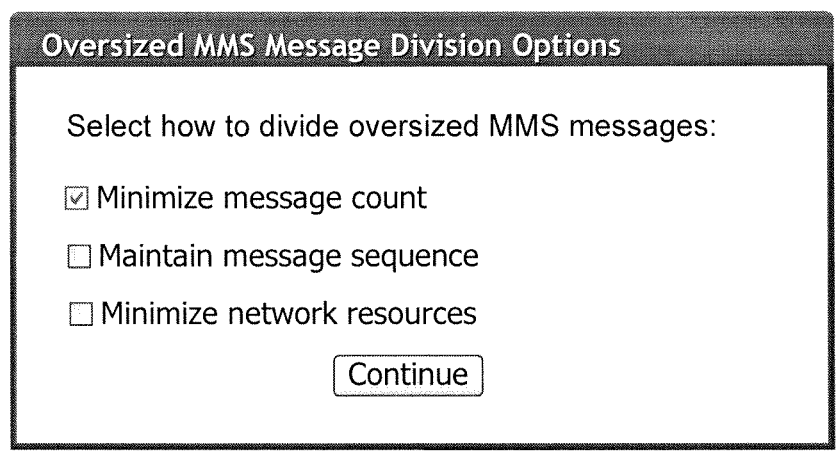
FIG. 4 illustrates an example of oversized MMS message division options that a user may select.

FIG. 4 illustrates an example of oversized MMS message division options that a user may select. As illustrated in FIG. 4, the user may elect to divide oversized MMS messages to minimize the number of the smaller MMS messages, to ensure that the information in the smaller MMS messages is sent in the same sequence as the information appears in the oversized MMS message, or to minimize network resources. In these cases, the oversized MMS message management subsystem 111 analyzes the oversized MMS message, determining the size of each separable component (e.g., each attachment), computes the size of potential MMS messages based on the selected option (rearranging the components if desired per the first or third options above), decides the optimal manner to generate the smaller MMS messages consistent with the selected option, and constructs and transmits the smaller MMS messages. Alternatively, the selection options may include an option that allows the user to go back to the oversized MMS message and reformulate it as desired.

The oversized MMS message management subsystem 111 may be configured to cause each of the smaller MMS messages to include a number that is representative of the total number of the smaller MMS messages that comprise the oversized MMS message, as well as a number that is representative of the sequence of the smaller MMS message within this set of messages. This may enable the receiving wireless mobile communication device to consolidate all of the smaller MMS messages that comprise a single oversized MMS message after they are received into the single oversized MMS message and for the information in the resulting oversized MMS message to be presented in the same order that it was presented in the original oversized MMS message. For example, a customized header can be added in the MMS Message Header indicating Segment Number and Total Segments in a particular message. When implemented by sender and receiver, this allows receiver of messages to reorder individual messages and show them in the order the message was sent from the sending device. Individual body parts in messages can also be numbered similarly, with body part header, to indicate the body part order number in the overall message structure.

Figure 5:
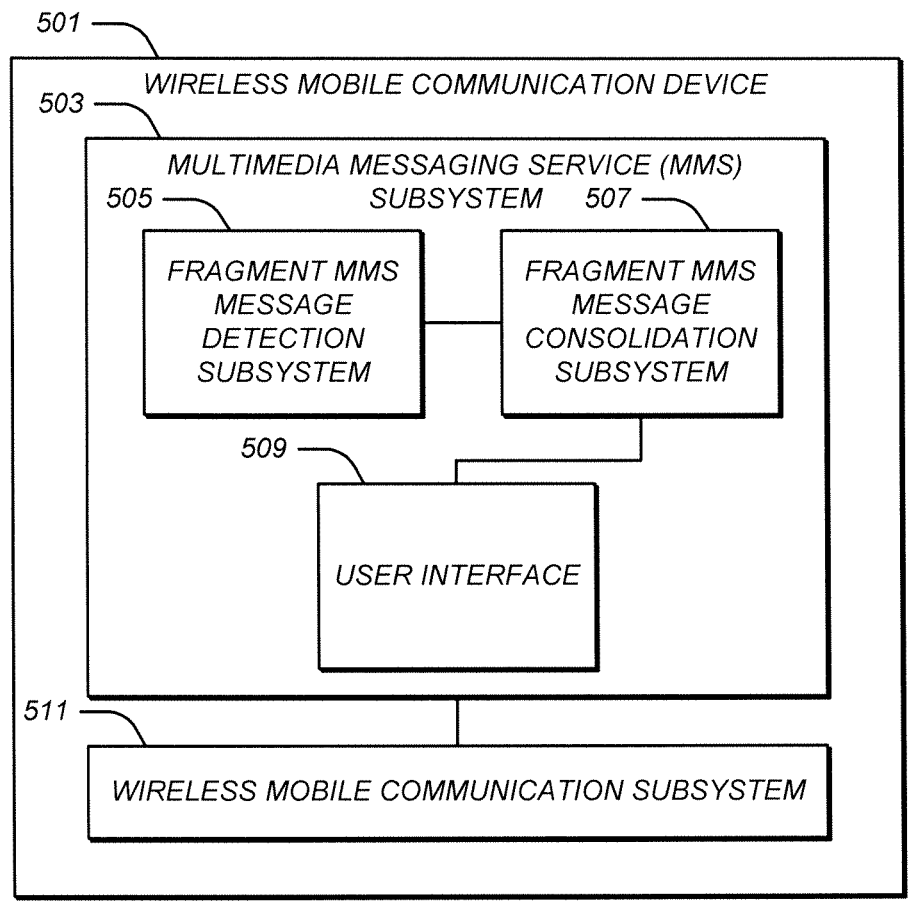
FIG. 5 illustrates an example of a wireless mobile communication device that consolidates received MMS messages that are part of a larger MMS message into the larger MMS message.

FIG. 5 illustrates an example of a wireless mobile communication device 501 that consolidates received MMS messages that are part of a larger MMS message into the larger MMS message. As illustrated in FIG. 5, the mobile communication device 501 includes a multimedia messaging service (MMS) subsystem 503 and a wireless mobile communication subsystem 511. Except as otherwise now noted, the MMS subsystem 503 and the wireless mobile communication subsystem 511 may be the same as the identically named components illustrated in FIG. 1 and discussed above, thus enabling the wireless mobile communication device 501 and its associated MMS subsystem 503 to permit oversized MMS messages to be formulated and delivered as a set of smaller MMS messages, each within an allowable size limit.

The MMS subsystem 503 includes a fragment MMS message detection subsystem 505. The fragment MMS message detection subsystem 505 is configured to detect when a received MMS message is a fragment of a larger MMS message. This may be accomplished, for example, by examining the received MMS message to see whether it includes information indicating that it is one of a sequence of MMS messages that comprise a single larger MMS message, such as to see whether the received MMS message has a sequence number and a total number of MMS messages that comprise the larger MMS message.

The MMS subsystem 503 also includes a fragment MMS message consolidation subsystem 507. The fragment MMS message consolidation subsystem 507 is configured to consolidate all detected fragment MMS messages, as detected by the fragment MMS message detection subsystem 505, into the larger MMS message of which they are part. The MMS fragment message consolidation subsystem 507 is also configured to cause a user interface 509 to deliver the larger consolidated MMS message to the user.

In other configurations, there may be no sequence numbering within each of the received MMS messages, in which case the receiving wireless mobile communication device 501 may simply present the smaller MMS messages in the order in which they are received and/or in the order of any sending time stamp that they may contain. In this configuration, receiving wireless mobile communication devices may be used to receive and present the smaller MMS messages without any modification. Even when the smaller MMS messages have sequence numbers, the receiving wireless mobile communication device may ignore these sequence numbers and simply present the smaller MMS messages in the order in which they are received, in the order of their sending time stamp, or in the order of their sequence number.

The detection and division of oversized MMS messages has thus-far been described as being performed in the wireless mobile communication device 101. In other configurations, the detection and/or the division of oversized MMS messages may be performed in whole or in part outside of the wireless mobile communication device 101, such as in a multimedia messaging service center (MMSC) server that is part of a computer network that processes the MMS messages. This alternate approach might be used when there is no mechanism in the wireless mobile communication device 101 that detects when an MMS message exceeds an allowable size limit or when this mechanism fails for any reason.

Figure 6:
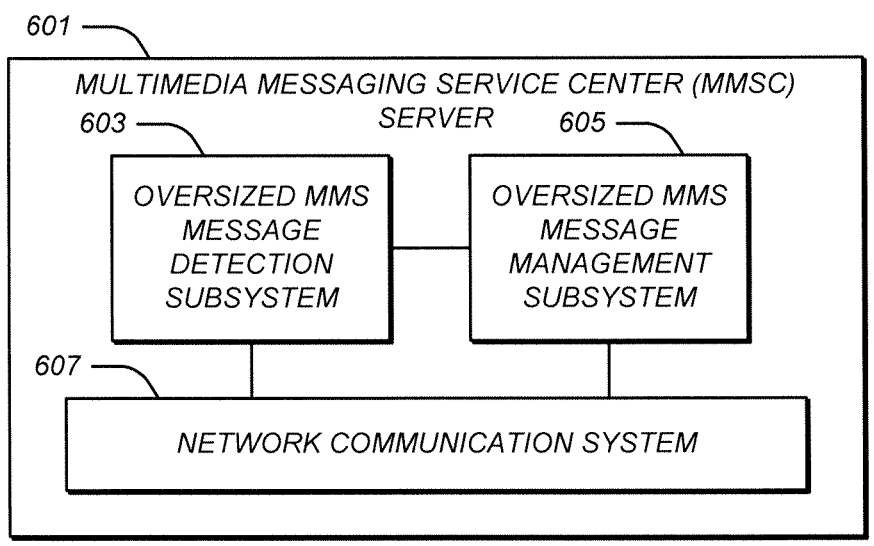
FIG. 6 illustrates an example of a multimedia messaging service center (MMSC) server that permits oversized MMS messages.

FIG. 6 illustrates an example of a multimedia messaging service center (MMSC) server 601 that permits oversized MMS messages. As illustrated in FIG. 6, the MMSC server 601 includes an oversized MMS message detection subsystem 603, an oversized MMS message management subsystem 605, and a network communication system 607.

The network communication system 607 is configured to receive and deliver MMS messages. The network communication system 607 may be of any type. For example, the network communication system 607 may include a network interface card.

The oversized MMS message detection subsystem 603 is configured to detect when an MMS message that is received by the network communication system 607 exceeds an allowable size limit. The oversized MMS messaging detection subsystem 603 may be configured to detect whether a received MMS message exceeds the allowable size limit by comparing the size of the MMS message—including all of its components—to a size limit.

The oversized MMS message management subsystem is configured to automatically divide each received oversized MMS message into smaller MMS messages that are each within the allowable size limit and to cause the network communication system 607 to deliver each of the smaller MMS messages to the phone number included in the oversized MMS message. The oversized MMS message management subsystem 605 may be configured to divide the oversized MMS message into the smaller messages in any of the ways discussed above in connection with the oversized MMS message management subsystem 111.

As part of this, the oversized MMS message management subsystem 111 may be configured to cause the wireless mobile communication device that was used by the sender of the oversized MMS message to display alert messages and to receive associated message division choices and/or to display message division options and associated responses of any the types discussed above in connection with the oversized MMS message management subsystem 111, including any of the alerts and/or dialogs illustrated in FIGS. 2-4 and discussed above. This may be accomplished, for example, by the oversized MMS message management subsystem 605 sending appropriate commands to and receiving responses back from the wireless mobile communication device on which the oversized MMS message was formulated. Alternatively, the oversized MMS message management subsystem 605 may automatically select the manner in which the MMS message is to be separated into multiple smaller messages based on network/carrier policy. In this case, the oversized MMS message management subsystem 605 may select different ways of separating the MSS message for different users (i.e., based on the user/mobile device identity).

Unless otherwise indicated, the wireless mobile communication devices 101 and 501, the MMSC server 601, the MMS subsystems 103 and 503, the oversized MMS message detection subsystem 109 and 603, the oversized MMS message management subsystem 111 and 605, the fragment MMS message detection subsystem 505, and the fragment MMS message consolidation subsystem 507 that have been discussed herein are each implemented with a computer system configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Figure 7:
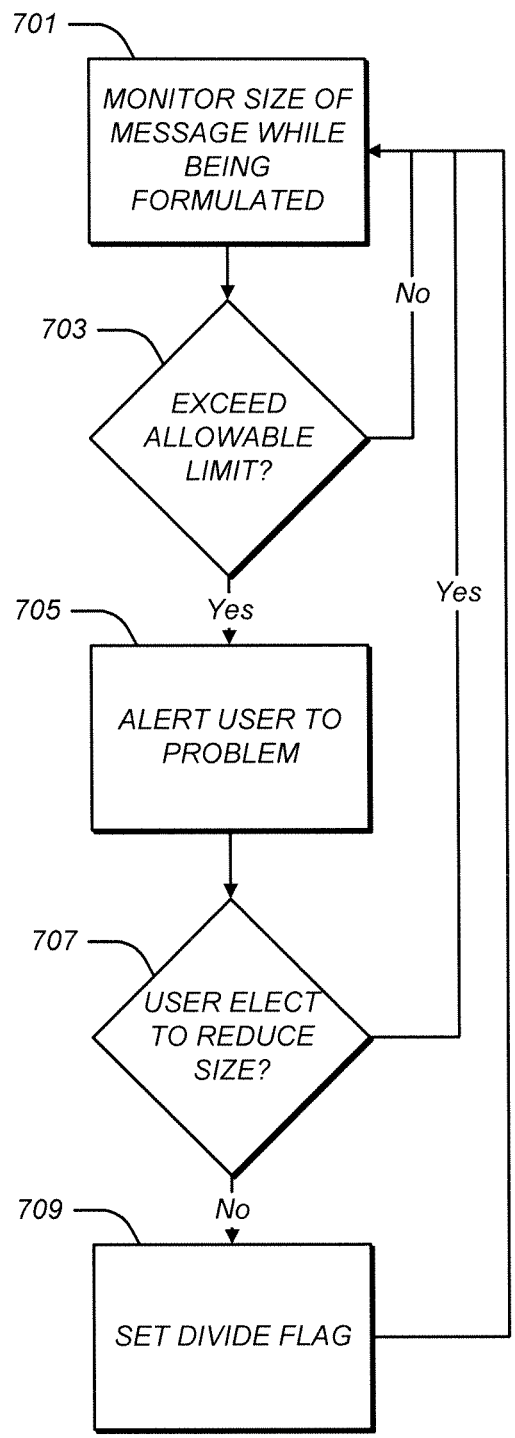
FIG. 7 illustrates an example of a process for monitoring MMS messages during formulation for excessive size.

FIG. 7 illustrates an example of a process for monitoring MMS messages during formulation for excessive size. The size of an MMS message may be monitored while the message is being formulated, as reflected by a Monitor Size of Message While Being Formulated step 701. The size may be compared to an allowable size limit, as reflected by an Exceed Allowable Limit? decision step 703. If the size does not exceed the allowable size limit, the monitoring of its size may continue, as reflected in FIG. 7. If the size does exceed an allowable size limit, on the other hand, the user may be alerted to this problem, as reflected by an Alert User to Problem step 705. The user may then be given the opportunity to reduce the size and/or to direct that the system automatically divide the oversized message into smaller messages that are each within the allowable size limit, as reflected by a User Elect to Reduce Size? decision step 707. If the user elects to have the system divide the oversized message, a divide flag may be set, as reflected by a Set Divide Flag step 709. The user may continue to formulate the message. Once the formulation is complete, the user may direct that the message be sent.

Figure 8:
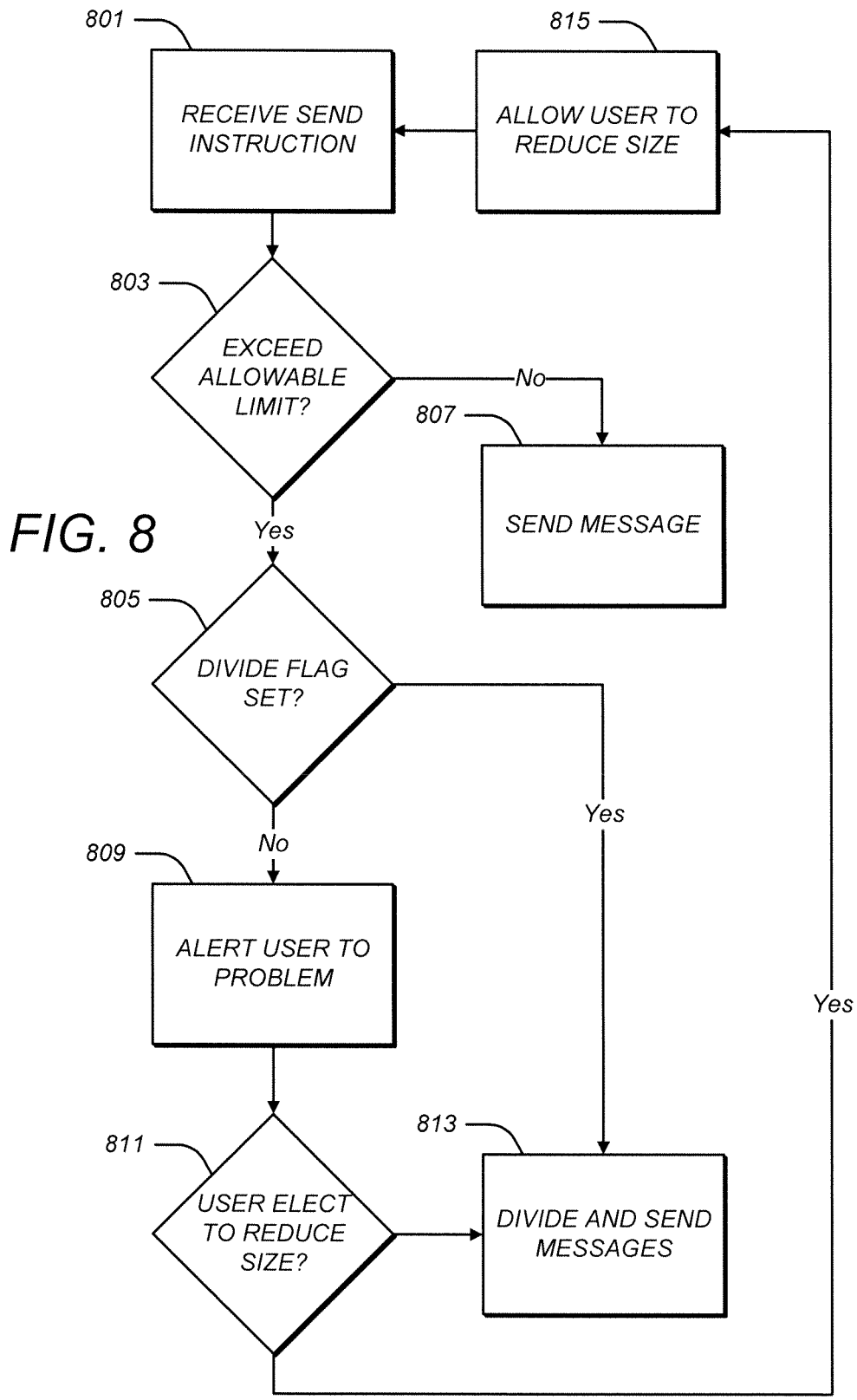
FIG. 8 illustrates an example of a process for sending MMS messages that may have an excessive size.

FIG. 8 illustrates an example of a process for sending MMS messages that have an excessive size. The instruction to send is received, as reflected by Receive Send Instruction step 801. The size of the message is tested to determine if it exceeds the allowable size limit, as reflected by an Exceed Allowable Limit? decision step 803. If not, the message is sent, as reflected by a Send Message step 807. If the message does exceed the allowable size limit, on the other hand, the status of the divide flag is be checked, as reflected by a Divide Flag Set? decision step 805. If the flag is set, the system proceeds to divide and send the resulting smaller messages without again alerting the user to the situation, as reflected by a Divide and Send Messages step 813. On the other hand, if the divide flag has not been set, the user is be alerted to the problem, as reflected by an Alert User To Problem step 809. The user is then offered the opportunity to reduce the size of the message, as reflected by a User Elect To Reduce Size? decision step 811. If the user has elected to reduce the size, the user is given the opportunity to do so, as reflected by an Allow User to Reduce Size step 815. Otherwise, the message is divided and sent, as reflected by the divide and send messages step 813.

Figure 9:
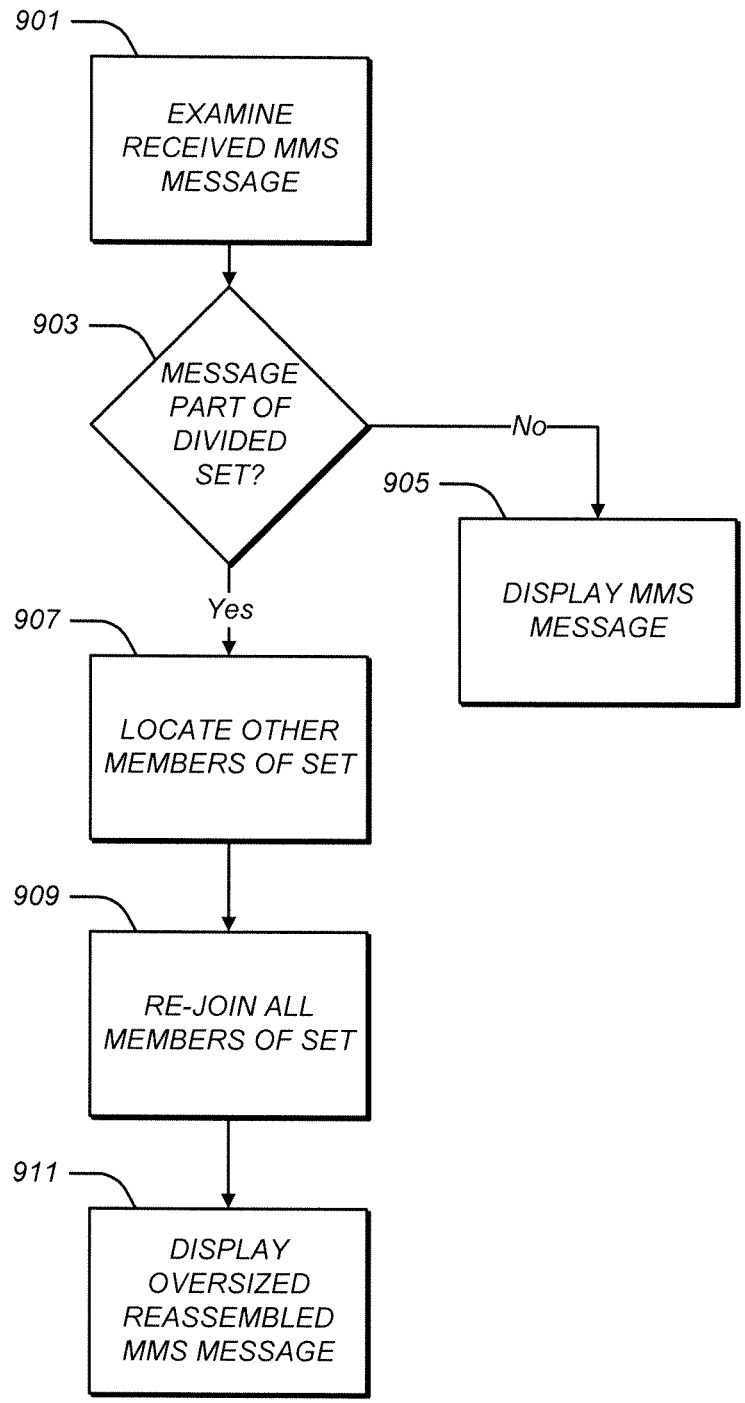
FIG. 9 illustrates an example of a process for receiving and reassembling a series of MMS messages that represent a single oversized MMS message.

FIG. 9 illustrates an example of a process for receiving and reassembling a series of MMS messages that represent a single oversized MMS message. A received message is examined, as reflected by a Examine Received MMS Message step 901. A determination is made as to whether the message is part of a divided set, as reflected by a Message Part Of Divided Set? decision step 903. This may be done, for example, by examining whether information in the message indicates that it is one of a specified number of messages that comprise but a single composed message. If the message is not part of a divided set, the message is displayed, as reflected by a Display MMS Message step 905. If the message is a member of a set, on the other hand, the other members of the set are located by examining the same information in other messages that have been received, as reflected by a Locate Other Members of Set step 907. All the messages that are part of the same set are rejoined, as reflected by a Re-Join All Members of Set step 909. The rejoined message is then displayed, as reflected by Display Oversized Reassembled MMS Message step 911.

Figure 10:
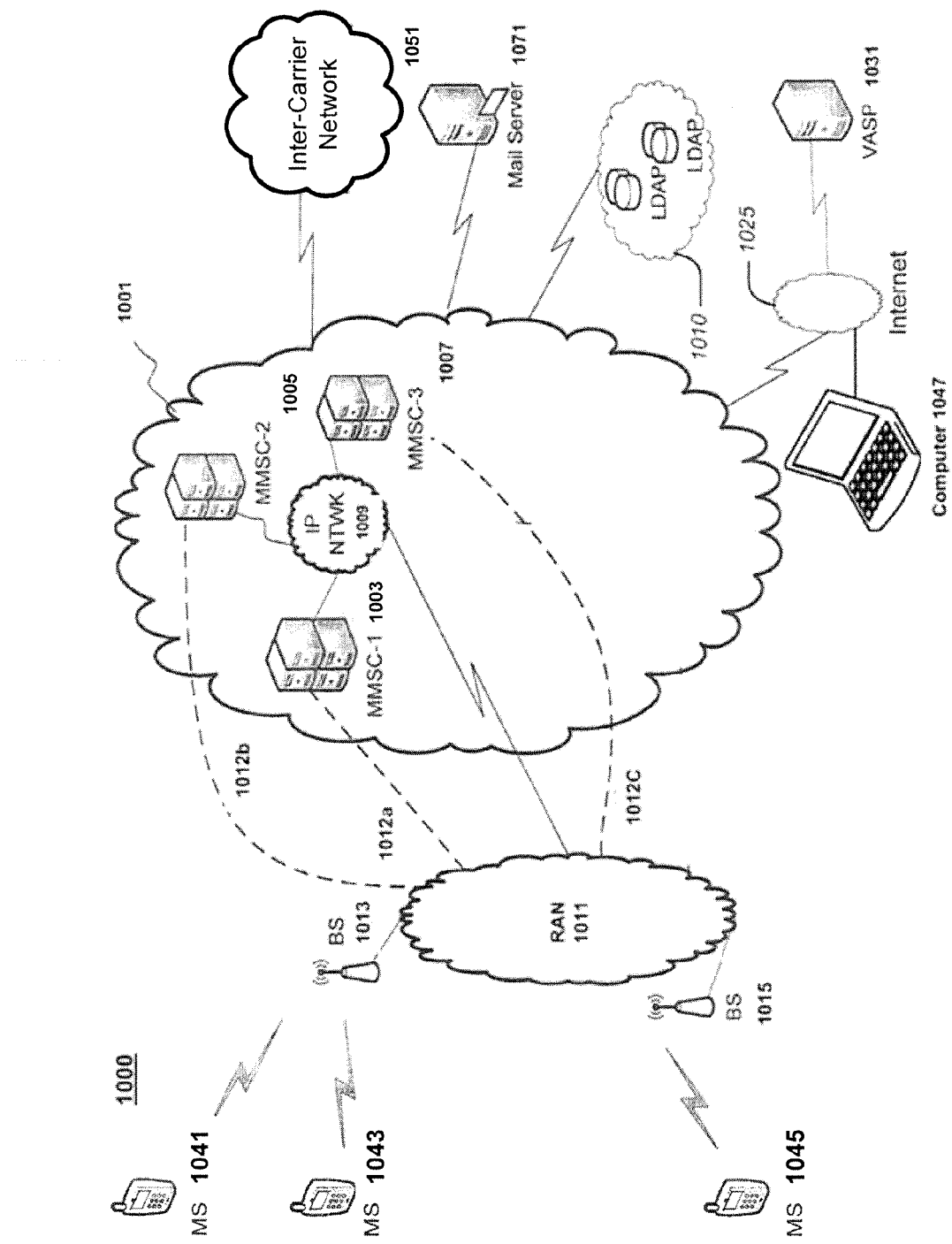
FIG. 10 illustrates an example of an MMS messaging system that may be adopted to deliver the MMS messages that are discussed herein.

FIG. 10 illustrates an example of an MMS messaging system that may be adopted to deliver the MMS messages that are discussed herein. In FIG. 10, the MS(s) 1041, 1043, and 1045 can connect to any one of the in-range Base Stations (BS(s) 1013 and 1015) in order to make a call (i.e. voice) or to transfer/receive data, including SMS and MMS type mobile messaging service messages. MS(s) 1041, 1043, and 1045 may communicate with other mobile stations or with another terminating device such as Computer 1047 via Network 1001 and Internet 1025 in order to obtain MMS content. BS 1013 and/or BS 1015 provide wireless access points (WAP) to the RAN 1011. In FIG. 5A, MSs 1041 and 1043 are connected to BS 1013 via the air-link, and MS 1045 is connected to BS 1015 via the air-link. Furthermore, BS 1013 and 1015 can communicate with devices on the Internet 1025 via other elements of RAN 1011 and Network 1001.

A message service center system routes a message, in this case a message from an originating mobile station which is operable within the wireless network. This message system with MMSC-1 1003, MMSC-2 1005, and MMSC-3 1007, may route the message based on an URI corresponding to a target mobile directory number (MDN) inputted via the originating mobile station. It should be noted that although MDN is used to identify the mobile station in the current example, other identifiers, such as a Mobile Identification Number (MIN), may also be used.

The MMSC confirms that originating MDN is capable of sending MMS messages and the destination MDN is capable of receiving MMS messages using an authentication directory or database for the mobile stations. A directory is a set of objects with similar attributes organized in a logical and hierarchical manner. In an exemplary illustration, an authentication directory may consist of a series of records for the mobile stations serviced by the mobile network, with each mobile station having a MDN, email address, service level, etc. In the example, the authentication directory is implemented on a light weight directory access protocol (LDAP) server coupled for communication with the MMSC, although the directory or database may be implemented on the MMSC itself.

Lightweight Directory Access Protocol is used by the Authentication Directory 1010 which is connected to Network 1001 and MMSC(s) 1003, 1005, and 1007. Lightweight Directory Access Protocol (LDAP) is an application protocol for querying and modifying directory services running over TCP/IP. In the example, LDAP is utilized by Network 1001 and MMSC 1003 for authentication of each mobile station's service level. The mobile station data typically enables validation of the mobile station, e.g., whether the mobile station is allowed to send a MMS message or to receive a MMS message, although such data may facilitate MMS service in some other fashion.

Network 1001 includes MMSC(s) 1003, 1005, 1007 and IP Network 1009. The MMSC(s) serve to deliver multimedia messages of text, graphic, video, audio and other media formats to Mobile Stations supported by the operator network and to other Mobile Stations connected to other operators' networks that are connected to the operator's network via Inter-Carrier Network 1051. Each MMSC acts as a focal point for exchange of multimedia based messages. The MMSC activates the sending flow when it receives a multimedia message sent from a Mobile Station, a value added service provider (VASP), an email server connected to the MMSC, or an inter-carrier network connected to the MMSC.

Three MMSC(s) are shown for discussion purposes. It is noted that there may be fewer MMSC(s); but in typical public carrier network deployments, the Network 1001 typically may include a large number of MMSC(s). MMSC-1 1003, MMSC-2 1005, MMSC-3 1007 are connected to each other via IP Network 1009. MMSC-1 1003, MMSC-2 1005, MMSC-3 1007 allow messages to be exchanged between MSs 1041, 1043 and 1045 and mobile stations connected to other operator networks via Inter-Carrier Network 1051. MMSC-1 1003, MMSC-2 1005, MMSC-3 1007 also allow messages to be exchanged between MSs 1041, 1043 and 1045 and the Mail Server 1071 and/or the VASP 1031. In this current network configuration, the MMSC(s) are designed to support certain types of multi-function traffic such as P2P, person-to-email and P2A. Furthermore, MMSC-1 1003, MMSC-2 1005, MMSC-3 1007 are connected to the RAN 1011 via Logical Connections 1012a, 1012b and 1012c. Logical Connection 1012a provides a logical connection from MMSC-1 1003 to RAN 1011. Similarly, Logical Connection 1012b provides a logical connection from MMSC-2 1005 to RAN 1011 and Logical Connection 1012c provides a logical connection from MMSC-3 1007 to RAN 1011.

Network 1001 is also connected to IC Network 1051 and Email Server 1071. By maintaining connections to Email Server 1071, mobile stations connected to Network 1001 may send and receive email. Furthermore, mobile stations connected to Network 1001 may transfer data and voice with users of other operator networks via Inter-Carrier Network 1051.

The systems and subsystems within a single wireless mobile communication may share the same computer system. Each computer system for the MMSC server may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the manner in which the message is split may depend on how much over the maximum size the message is. The excess size and, optionally, the limit, may be conveyed to the user to allow the user to better judge, for example, whether to eliminate one or more components, rather than to have the oversized message divided into separate messages. The MMS message may be split into messages of different types (e.g., into MMS, EMS, and/or SMS or any combination thereof) and these selections may be conveyed to the sender and/or receiver. One or more components of an oversized message (e.g., a video) may be removed from the message and uploaded to a network server with a link to that component on the server being provided in the message instead Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to these corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended embracement of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A multimedia messaging service center (MMSC) server comprising:
    a network communication system configured to receive from a computer network a multimedia messaging service ("MMS") message originating from a sender and including a plurality of separable components;
    an oversized MMS message detection subsystem configured to detect whether the received MMS message exceeds an allowable size limit; and
    an oversized MMS message management subsystem configured, if the received MMS message is detected to exceed the allowable size limit, to:
        determine a size of each separable component in the plurality of separable components of the received MMS message, each separable component in the plurality of separable components being a single attachment to the received MMS message,
        determine an optimal manner to separate each separable component in the plurality of separable components into one of a plurality of smaller MMS messages, each smaller MMS message in the plurality of smaller MMS messages being within the allowable size limit, and
        construct and transmit the plurality of smaller MMS messages according to the determined optimal manner of separating the separable components.

2. The MMSC server of claim 1 wherein the oversized MMS message management subsystem is configured to cause an oversized message alert to be delivered to the sender of the received MMS message if the received MMS messages is detected to be an oversized MMS message exceeding the allowable size limit.

3. The MMSC server of claim 2 wherein the oversized MMS message management subsystem is configured to cause the oversized message alert to be delivered to the sender of a received MMS message to include a total count of the smaller MMS messages into which the plurality of separable components of the received MMS message is separated.

4. The MMSC server of claim 1 wherein the oversized MMS message management subsystem is configured to allow the sender to specify whether the oversized MMS message management subsystem should determine the optimal manner to separate each separable component in the plurality of separable components of the received MMS message into one of the smaller MMS messages.

5. The MMSC server of claim 1 wherein the oversized MMS message management subsystem is configured to allow the sender to edit the received MMS message so as to be below the allowable size limit if the received MMS message is detected to exceed the allowable size limit.

6. The MMSC server of claim 1 wherein the oversized MMS message management subsystem is configured to automatically determine a message division method to apply to the received MMS message based on a mobile device identity.

7. The MMSC server of claim 6 wherein the oversized MMS message management subsystem is configured to apply different message division methods to different oversized MMS messages of a plurality of oversized MMS messages based on an identity of a sender of each oversized MMS message.

8. The MMSC server of claim 6 wherein the oversized MMS message management subsystem is configured to determine optimal manners of separating pluralities of separable components of all oversized MMS messages received from a particular sender into smaller MMS messages according to a message division method that was previously set by the particular sender.

9. The MMSC server of claim 1 wherein the oversized MMS message management subsystem is configured to determine the optimal manner to separate each separable component in the plurality of separable components of the received MMS message into one of the smaller MMS messages in a manner that minimizes the total number of the smaller MMS messages.

10. The MMSC server of claim 1 wherein the oversized MMS message management subsystem is configured to deliver each of the smaller MMS messages to a designated recipient's phone number in a sequence that causes the separable components in the smaller MMS messages to be delivered to the designated recipient's phone number in a same sequence as the separable components appeared in the received MMS message.

11. The MMSC server of claim 1 wherein the oversized MMS message management subsystem is configured to determine the optimal manner to separate each separable component in the plurality of separable components of the received MMS message into one of the smaller MMS messages in a manner that first minimizes the total number of the smaller MMS messages and, to the extent thereafter possible, causes the separable components in the smaller MMS messages to be delivered to a recipient's phone number in a same sequence as the separable components appeared in the received MMS message.

12. The MMSC server of claim 1 wherein the oversized MMS message management subsystem is configured to determine the optimal manner to separate each separable component in the plurality of separable components of the received MMS message into one of the smaller MMS messages in a manner that minimizes network resources needed to deliver the smaller MMS messages.

13. The MMSC server of claim 1 wherein the oversized MMS message management subsystem is configured to:
receive information from the sender of the received MMS message indicative of the optimal manner to separate each separable component in the plurality of separable components of the received MMS message into one of the smaller MMS messages, and
construct and transmit the plurality of smaller MMS messages in the optimal manner specified by the received information.

14. The MMSC server of claim 1 wherein the oversized MMS message management subsystem is configured to cause each of the smaller MMS messages to include a number that is representative of a total number of the smaller MMS messages that were constructed from the received MMS message and a number that is representative of the sequence of the smaller MMS message within a set including all the smaller MMS messages.

15. The MMSC server of claim 1 wherein when the received MMS message includes a plurality of multimedia items among the plurality of separable components, the oversized MMS message management subsystem is configured to place the plurality of multimedia items among the smaller messages in such a manner as to minimize a total number of the smaller messages used to send the plurality of multimedia items.

16. The MMSC server of claim 15 wherein the oversized MMS message management subsystem is configured to automatically place the plurality of multimedia items into the smaller messages in a sequence order that does not match a sequence order of the multimedia items in the received MMS message.

17. The MMSC server of claim 15 wherein the oversized MMS message management subsystem is further configured to:
determine the size of each of the plurality of multimedia items; and
determine placement of the plurality of multimedia items among the smaller messages based at least in part on the determined sizes of the plurality of multimedia items.

18. The MMSC server of claim 17 wherein the oversized MMS message management subsystem is further configured to:
compute the sizes of potential MMS messages based on rearranging the plurality of multimedia items among the smaller MMS messages; and
determine a distribution of multimedia items among the smaller messages that is consistent with an objective of minimizing the total number of the smaller messages used to send the plurality of multimedia items.

19. The MMSC server of claim 1 wherein the oversized MMS message management subsystem is further configured to transcode media elements included in the received MMS message into smaller sizes, and to include the transcoded media elements into the smaller MMS messages.

20. A method comprising:
receiving, from a computer network, a multimedia messaging service ("MMS") message originating from a sender and including a plurality of separable components;
detecting whether the received MMS message exceeds an allowable size limit; and
if the received MMS message is detected to exceed the allowable size limit:
determining a size of each separable component in the plurality of separable components of the received MMS message, each separable component in the plurality of separable components being a single attachment to the received MMS message,
determining an optimal manner to separate each separable component in the plurality of separable components into one of a plurality of smaller MMS messages, each smaller MMS message in the plurality of smaller MMS messages being within the allowable size limit, and
constructing and transmitting the plurality of smaller MMS messages according to the determined optimal manner of separating the separable components.

* * * * *